Nov. 20, 1951  B. K. ROBERTS ET AL  2,575,892
APPARATUS FOR PRODUCING SUBSTANTIALLY CLEAR ICE BODIES
Filed Feb. 28, 1949  2 SHEETS—SHEET 1
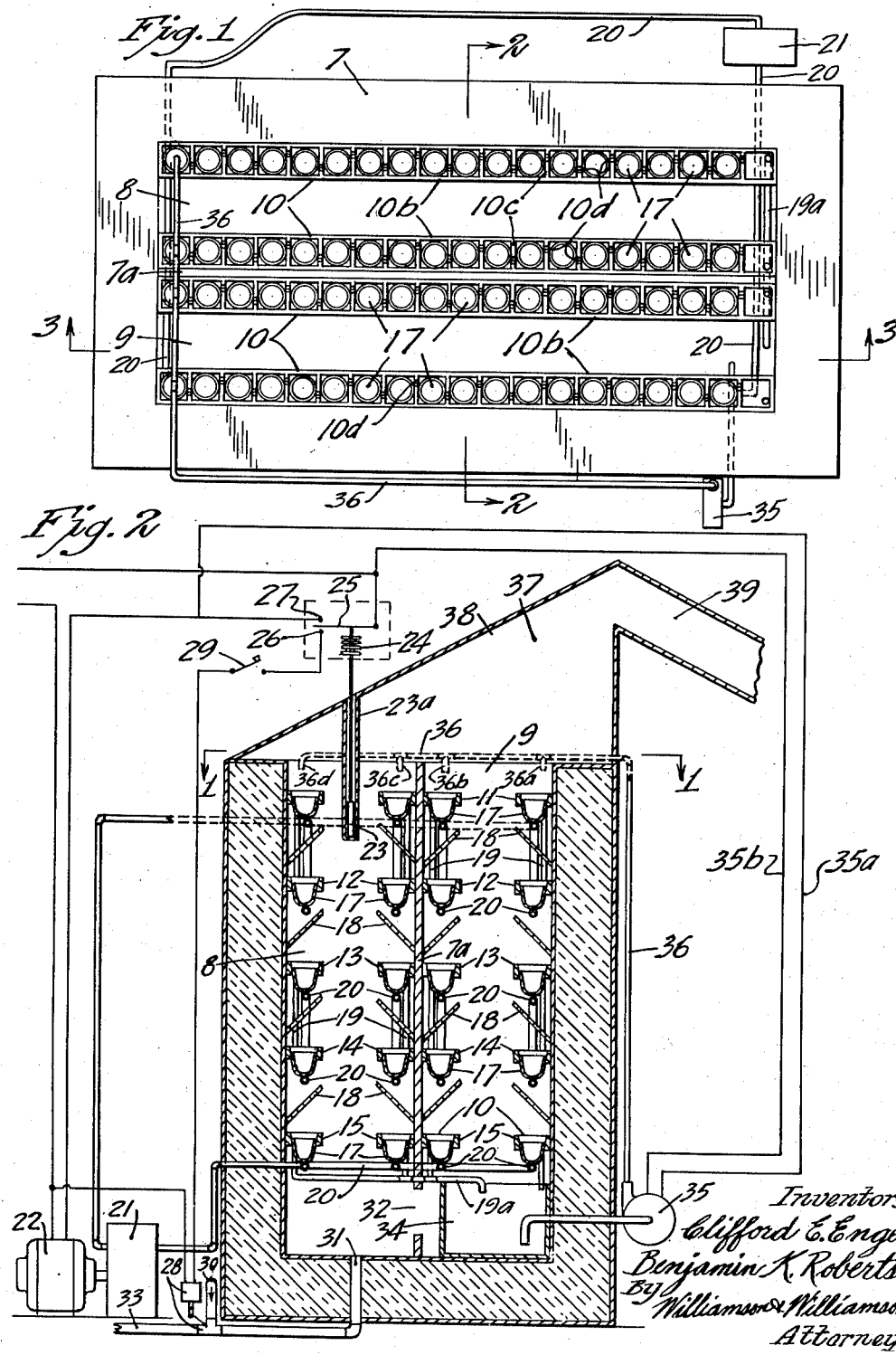
Inventors
Clifford E. Enger
Benjamin K. Roberts
By Williamson & Williamson
Attorneys

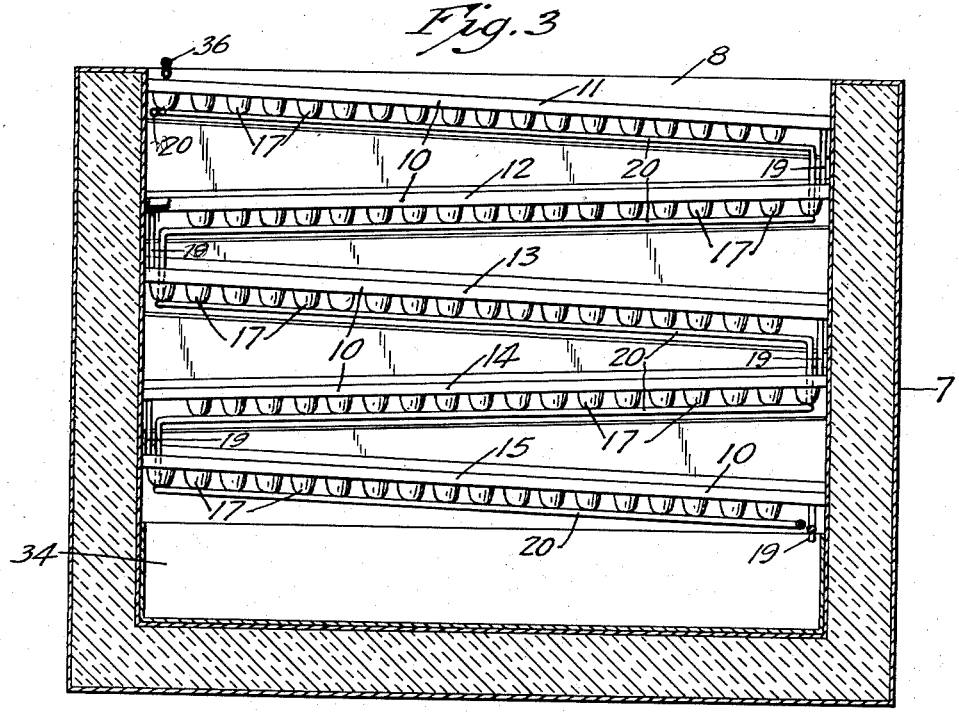
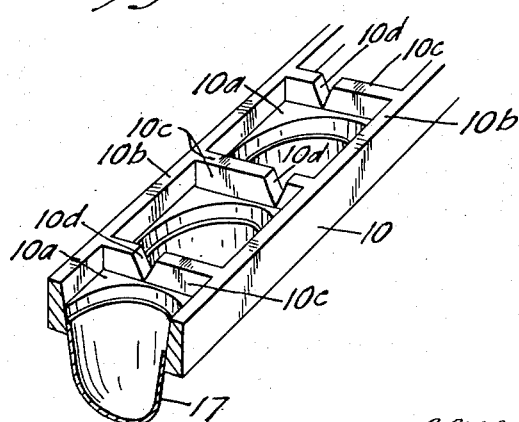

Patented Nov. 20, 1951

2,575,892

UNITED STATES PATENT OFFICE 2,575,892

APPARATUS FOR PRODUCING SUBSTANTIALLY CLEAR ICE BODIES

Benjamin K. Roberts, Austin, Minn., and Clifford E. Enger, Los Angeles, Calif.; said Enger assignor to Roberts Products Incorporated, Austin, Minn., a corporation of Minnesota.

Application February 28, 1949, Serial No. 78,816

2 Claims. (Cl. 62—106)

This invention relates particularly to a method and apparatus for producing clear ice bodies.

In the freezing of artificial ice, it has been found to be a problem to freeze clear solid ice cubes which simulate the appearance of natural ice and thus meet with public acceptance much more readily than the cloudy cubes which are normally produced in conventional ice-making machines.

It is an object of our invention to provide a machine adapted to produce clear ice bodies.

It is another object to provide a method for producing clear ice bodies.

It is a further object to provide a plurality of intercommunicating open-topped molds mounted in a freezing compartment and adapted to have liquid circulated from one mold to the other and to produce circulation in the molds to carry off the air bubbles from the liquid being frozen and thus produce substantially clear ice bodies.

It is still a further object to provide a series of open-topped molds with an inclined trough for carrying liquid from one mold to the other to produce a continuous cascade into each of the molds to circulate the water during the freezing of the liquid therein.

It is another object to provide a machine of the class described which is adapted for continuous thermostatically controlled operation whereby the clear ice after being frozen is released from the molds and carried from the freezing compartment to a dry storage location.

It is still another object to provide a clear ice cube producing machine having a thermostatic control system adapted to automatically operate the freezing and releasing cycles of said machine.

This releasing and flotation of the cubes from the freezing compartment to a storage compartment embodies substantially the same principles which were disclosed in a copending application filed in the name of Benjamin K. Roberts entitled Method for Producing Ice Bodies and Apparatus for Producing the Same and identified by the Serial No. 3605.

The above and other objects and advantages of our invention will more fully appear from the following description made in connection with the accompanying drawings wherein like reference characters refer to similar parts throughout the several views and in which;

Fig. 1 is a horizontal sectional view taken substantially along the line 1—1 of Fig. 2 and showing the freezing compartment in top plan;

Fig. 2 is a vertical sectional view taken substantially along the line 2—2 of Fig. 1 and showing a diagrammatic sketch of the thermostat control and the compressor unit and the electrical circuit therefor;

Fig. 3 is a longitudinal vertical sectional view taken substantially along the line 3—3 of Fig. 1 and showing one bank of inclined mold containing troughs in side elevation; and Fig. 4 is a perspective view showing the detail of a mold-containing tray.

As illustrated in the accompanying drawings, we provide an insulated casing 7 defining a freezing chamber which is divided by a central partition 7a into two separate compartments 8 and 9. A plurality of mold-containing troughs 10 are mounted in freezing compartments 8 and 9. In the form shown these troughs 10 extend longitudinally of the compartments and are mounted in fixed relation on the side walls of each compartment 8 and 9 in vertically spaced relation one above the other, alternate troughs on each compartment wall being oppositely inclined.

The top row of troughs will be designated by the numeral 11, the next row therebelow will be designated 12, and the next succeeding rows 13, 14, and 15 respectively. All four troughs in top row 11 slope in one direction, the troughs in row 12 slope in the other direction, and so on down through rows 13, 14, and 15.

Each trough has a plurality of cup shaped open-topped molds 17 mounted in longitudinally spaced relation therein, as best shown in Fig. 1. The molds 17 are sunken into the bottom of the troughs 10, as best shown in Fig. 4, to provide a slight clearance between the top of the mold 17 and the top surface 10a of the trough bottom. The sides of the troughs 10 extend upwardly above the trough bottom to form liquid-confining walls 10b to retain the liquid therein during its flow downwardly through the trough. A partition 10c is mounted across the trough 10 between the liquid confining walls 10b between each adjacent pair of molds. This partition has a liquid flow notch 10d formed therein, the notches 10d of alternate partitions 10c being alternately offset from the longitudinal center line of the trough as best shown in Fig. 1 for purposes that will be brought out hereafter.

An angularly disposed upwardly sloping baffle plate 18 is fixed to the compartment walls below each of said troughs to guide the floating ice cubes upwardly in the compartments 8 and 9 and prevent clogging thereof. A plurality of interconnection tubes 19 respectively interconnect the lower ends of the trough with the upper ends of the troughs disposed therebelow to permit continuous flow of fluid from one trough to the other in each of the individual banks. In the form shown a collection manifold 19a collects the discharge from three of the banks of troughs and discharges the same into a reservoir tank 34, which will be described in detail later. The fourth bank of troughs merely discharges directly into said reservoir tank 34. A refrigeration coil 20 extends under each of the troughs and contacts the bottom portion of each of the molds, and each bank of troughs has its own branch of the coil 20, as is best shown in Figs. 1, 2 and 3. A conventional refrigeration mechanism 21 supplies the refrigeration coil 20 with refrigerant gas and is driven as by an electric motor 22.

A thermostatic control mechanism having the bulb 23 communicating with an expansion bellows 24 is provided to actuate an electric switch 25 which in the form shown is a single pole double throw switch and is diagrammatically illustrated in Fig. 2. The bulb 23 is disposed within an air gap tube 23a to produce a slight lag in the thermostatic bellows 24 to temperatures within the freezing chamber. When the bellows 24 is contracted by a low temperature within the chamber, the shiftable element of the switch 25 is in contact with stationary contact 26, and when the bellows 24 is expanded by a rise in temperature, the movable contact of switch 25 swings upwardly to close the electric circuit through contact 27.

The solenoid valve 28 is electrically connected in series with the circuit through contact 26, and a shut-off switch 29 is interposed in said circuit between the contact 26 and the solenoid. Said solenoid valve 28 controls the flow of liquid from a liquid supply inlet 30 into the freezing compartments 8 and 9 through the inlet conduit 31 and intercommunicating openings 32, and also controls the backflow of liquid through the conduit 31 to the drain 33, as best shown in Fig. 2.

A reservoir tank 34 is mounted in the bottom of compartment 9 and serves as a source of liquid supply for a pump 35, best shown in Fig. 2. The pump 35 carries liquid from the reservoir tank 34 upwardly through a supply conduit 36 and discharges said liquid through the outlets 36a, 36b, and 36c which respectively supply the circulating water to the individual troughs 10 in the top row 11. This liquid is simultaneously discharged into all four banks of troughs to circulate liquid in the individual molds during the freezing thereof to carry off any air bubbles and permit freezing of clear cubes in the molds. A collection flow chamber 37 is formed across the top of the refrigeration chamber as by a sloping cover plate 38 which terminates at the top in a flow outlet conduit 39 which extends to a suitable drain and collection location (not shown herein but thoroughly described in the above identified co-pending Roberts application.) The thermostatic control mechanism is designed to operate the pump 35, the solenoid valve 38, and compressor 21 with its motor 22.

Operation

To begin the freezing cycle, the refrigeration chamber is initially flooded by opening the solenoid valve 28 to permit liquid to flow in through liquid supply inlet 30. Thereafter, the solenoid is deenergized, and the valve swings back into normal position to drain the two chambers 8 and 9 out through drain 33. The machine is now ready to go into thermostatically controlled automatic operation. During the freezing operation the bellows 24 is in expanded position to swing the movable contact of switch 25 upwardly to close the circuit through stationary contact 27. Both the pump 35 and the compressor motor 22 are connected in said circuit to be operated as long as the switch 25 is in upward position. The pump 35 pumps water from the reservoir 34 and discharges the same into the upper row of troughs 11. The water then flows down into the upper portions of the inclined troughs in row 11 to the lower ends thereof and from there downwardly through interconnection conduits 19 into the respective troughs in row 12 and so on down the individual trough banks. As the liquid flows down each of the inclined troughs, the alternately off-set notches 10d produce a cascading of the water downwardly into each individual mold disposed therebelow to produce a whirling circulatory action in each of the molds. This circulatory action carries off the air in the liquid and permits it to freeze in a solid substantially cloudless cube. By offsetting the liquid flow notches 10d from the center line, the liquid is introduced into each individual mold substantially adjacent the side wall thereof to produce a tangential whirlpool action in the respective molds. The bottom of each mold is concavely curved, as best shown in Fig. 4, to smoothly guide the circulating water around the bottom and upwardly back to the top of the mold and thus carry off the air.

When the temperature in the chamber reaches a predetermined low point, the liquid in each of the molds will be completely frozen and the thermostatic control switch is set to open the solenoid valve 28 and flood the chamber at that time to overflow liquid out through flow chamber 37 and flow outlet conduit 39. The solenoid valve 28 is normally in position to permit free drainage from the chambers 8 and 9 out to drain 33 and to positively prevent flow of liquid through inlet conduit 30. When the bellows 24 contracts to a predetermined point, the movable contact of switch 25 shuts off the compressor motor and pump and closes the circuit through the solenoid valve 28 by making contact with stationary contact 26 and simultaneously opens the valve and closes the drain to flood the chambers 8 and 9. The manually operated shut-off switch 29 may be opened to prevent flooding the chamber when the temperature drops therein, and cubes are merely stored until such time as switch 29 is again closed. This is desirable for storing cubes over a week-end or overnight, and as soon as the switch 29 is closed, the machine is again on automatic operation to periodically discharge clear ice cubes into a storage location.

The air gap provided by tube 26 produces a time lag between actual temperature reached within the freezing chamber and the temperature reacting upon bulb 23. This permits relatively simple adjustment of the thermostatic mechanism and increases the efficiency of its operation. When the chambers 8 and 9 are flooded, the cubes in the molds are released and floated out through the flow chamber 37 and conduit 39 into a suitable storage location (not shown). When due to the flooding of the chambers, the temperature reaches a certain maximum point, the shiftable contact of switch 25 is raised out of engagement with contact 26, and the solenoid valve 28 opens the drain through drain outlet 33 and shuts off the water supply through inlet 31. The molds 17 are left filled with water as well as the reservoir tank 34 after said chambers have been drained, and the switch 25 will again start the compressor motor 22 and pump 35 to repeat the cycle. With the switch 29 closed, the operation of the machine is continuous and automatic, but after switch 29 is open, the cubes will be frozen in each mold and merely stored therein until the switch 29 is again closed to put the machine into automatic operation.

The countersinking of the molds into suitable material which is a poor conductor of heat and cold such as a heavy plastic material maintains a layer of frozen liquid across the top of each cube. This prevents a crust from freezing on the top and permits the circulating water to continuously carry off the air in the molds.

It has been found that merely flowing liquid over a series of open-topped molds will carry off most of the air bubbles in the molds and produce substantially clear ice cubes which are satisfactory for certain commercial uses; however, we have found that the best results are obtained by the method which specifically consists in cascading liquid into a liquid filled open-topped cup-shaped mold to produce a whirlpool circulatory action therein during the freezing operation.

It will be seen that we have provided and disclosed herein a novel and improved method for producing clear ice bodies, as well as the apparatus for producing the same. The apparatus is adapted to automatically freeze a plurality of clear ice cubes, and after freezing, to release the same from their individual molds and carry them by flotation to a storage location. The circulation of the water over the ice molds during the freezing operation carries off the air in the liquid and produces clear ice bodies in each of the molds. The thermostatic system operates continuously and automatically to alternately flood the chamber with liquid and carry off the frozen cubes therewith and after draining the chamber to freeze the liquid remaining in said molds and to circulate liquid through said molds during the freezing operation.

It will, of course, be understood that various changes may be made in the form, details, arrangement and proportions of the parts without departing from the scope of our invention.

What we claim is:

1. Mechanism for producing clear ice bodies comprising at least one inclined trough, a plurality of open-topped cup-shaped molds mounted in longitudinally spaced relation in the bottom of said trough, and a plurality of spaced partitions transversely extending across said trough between the sides thereof and interposed between said molds to produce a water head above each mold and cascade the water into the respective molds to produce circulation therein during the freezing operation and carry off the air bubbles from the liquid being frozen in said molds and produce clear ice cubes therein.

2. Mechanism for producing clear ice cubes set forth in claim 1 and said partitions having laterally offset flow notches formed therein and disposed in substantial alignment with the side wall of said cup-shaped molds to respectively discharge liquid into said molds substantially tangentially of the sides thereof and produce a circulatory whirlpool action of said molds during the freezing operation and carry off the air bubbles from the liquid to produce clear ice cubes therein.

BENJAMIN K. ROBERTS.
CLIFFORD E. ENGER.

REFERENCES CITED

The following references are of record in the file of this patent:

UNITED STATES PATENTS

| Number | Name | Date |
|---|---|---|
| 706,510 | Barrath | Aug. 12, 1902 |
| 963,311 | McCrary | July 5, 1910 |
| 1,219,897 | Althoff | Mar. 20, 1917 |
| 2,220,001 | Potter | Oct. 29, 1940 |
| 2,349,451 | Motz | May 23, 1944 |
| 2,443,203 | Smith | June 15, 1948 |